(No Model.)
F. C. FOSTER.
VELOCIPEDE.
No. 448,952. Patented Mar. 24, 1891.
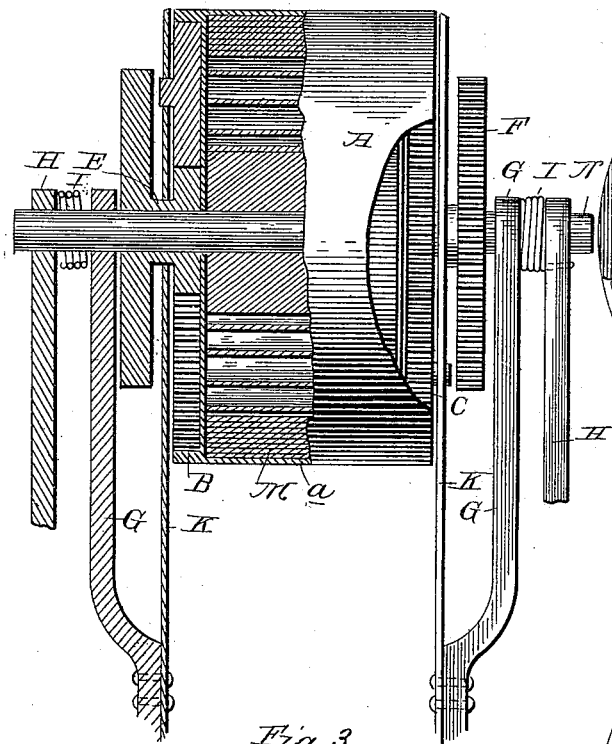
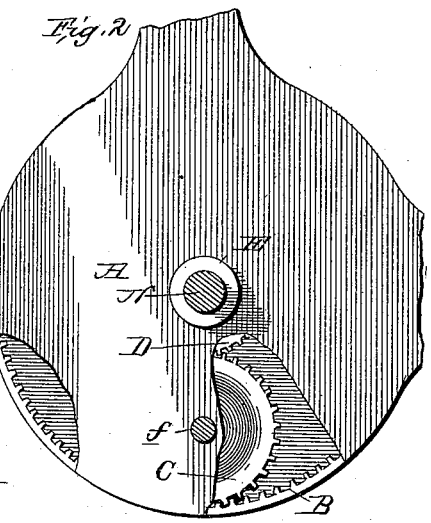
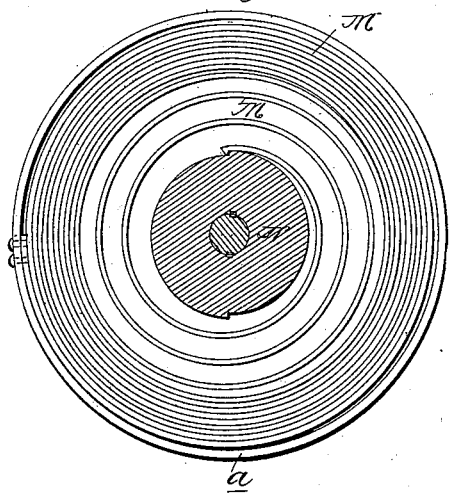
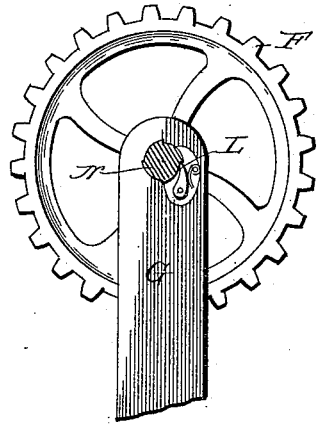
Witnesses:
F. P. Cornwall
L. S. Bacon
Inventor
Freling C. Foster,
By Stoddard & Co.

UNITED STATES PATENT OFFICE.

FRELING C. FOSTER, OF CHICAGO, ILLINOIS.

VELOCIPEDE.

SPECIFICATION forming part of Letters Patent No. 448,952, dated March 24, 1891.

Application filed October 13, 1890. Serial No. 368,044. (No model.)

*To all whom it may concern:*

Be it known that I, FRELING C. FOSTER, a citizen of the United States, residing at Chicago, in the county of Cook and State of Illinois, have invented a new and useful Attachment to Velocipedes, of which the following is a specification.

The object is to increase the speed of a velocipede with less exertion on the part of the rider by the use of compound force derived from the use of a spring and cog-wheels.

My invention consists of an attachment to bicycles, tricycles, and other velocipedes, (and more especially to the Safety bicycle;) and the object of my invention is to permit the working of the velocipede with less exertion on the part of the rider than is required with the ordinary form of machinery; and this object is attained by the use of a certain novel construction and combination of parts fully described hereinafter in connection with the accompanying drawings and especially pointed out.

I attain my object by the mechanism illustrated in the accompanying drawings, in which—

Figure 1 represents my invention complete as it will appear when attached to a bicycle, viewing it from the front or back of the bicycle. Fig. 2 is a side view of the drum which contains the spring and cog-wheels. Fig. 3 is a side view of cog-wheel F and one of the main supports, a front view of which is seen in Fig. 1. Fig. 4 is a side view of the spring and axis, a front view of which is seen in Fig. 1. Fig. 5 is a side view of the pedal, a front view of which is seen in Fig. 1.

Similar letters refer to similar parts throughout the several views.

In Fig. 1 the letter A represents the outside of the cylindrical drum that contains the spring M. *a* is the inside of the drum, showing the spring M.

B is the flanged projection on the ends of the drum, and on the inside of these projections are cogs, which engage with the cog-wheel C, mounted on a stub-axle journaled in the support, a side view of which appears in Fig. 2. C connects with cog-wheel D, which is also shown in Fig. 2. Cog-wheel D has a short hollow neck E, and to the outer end of this neck E is fastened a large cog-wheel F, a side view of which is shown in Fig. 3.

F is the cog-wheel on which the propelling-chain runs to the back wheel of the bicycle.

There are two supports G and K.

G is an arm that projects from the main support K. A side view of G is shown in Fig. 3.

H is the pedal that is worked with a downward motion of about eighty degrees to wind the main spring M. A side view of H is Fig. 5.

I is the spring that is used to raise the pedal while in the act of winding the main spring M.

J is the arm or neck that supports cog-wheel C, and is shown in Fig. 2.

K is the main support of the bicycle, and runs from the back to the seat and also to the shaft that runs from the front wheel to steer by. It covers the sides of the drum, as shown in Fig. 2, to prevent dirt collecting in cog-wheels B, C, and D.

L is the pawl engaging with notches in the axle, which holds the spring when it is wound, and is connected with the arm-support G.

M is the spring from which I derive my power. It is to be of fine steel and to have from ten to twenty coils. One end of this spring will be fastened to the inside of the drum, as shown in Fig. 4. The other end of the spring will be turned over, making a hook, and this hook is to fit into a groove in the axis N, as shown in Fig. 4. This main axis N is shown in all the views, and is made large in the center, so the spring can be wound tight without any fear of breaking.

O in Fig. 5 is the ratchet, which is fastened to the pedal H, that winds the spring on axis N.

The apparatus will be placed vertically just about the middle of the back wheel and right in front of it, or just between the two wheels of the bicycle and almost under the seat.

By the above construction it will be seen that as the cranks are shoved down the spring M is wound up, and in unwinding rotates the casing and cog-wheels, which in turn rotate the sprocket-wheels and drive the machine.

Having thus described my invention, what I claim as new, and desire to secure by Letters Patent, is—

In a velocipede, the combination, with the frame, of a crank-axle, a boxing surrounding the same, a spring interposed between the boxing and axle, a series of cogs on the boxing, cog-wheels meshing therewith, sprocket-wheels having cog-wheels on their inner ends meshing with the said other cog-wheel, cranks on the axle, springs for normally raising the crank, and pawls for engaging the axle, substantially as described.

FRELING C. FOSTER.

Witnesses:
MARSHALL A. ROE,
CHAS. E. CRANE.